Figure 1:
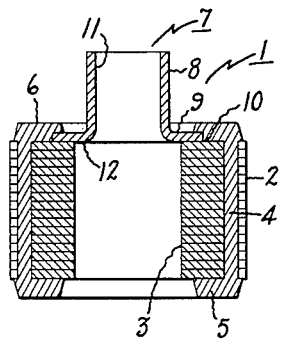

April 3, 1956     F. H. FLEISCHER     2,740,910

ROTOR MEMBER FOR DYNAMOELECTRIC MACHINE

Filed May 2, 1952

Inventor:
Frank H. Fleischer,
by Browell F. Mack
His Attorney.

United States Patent Office 2,740,910
Patented Apr. 3, 1956

2,740,910

ROTOR MEMBER FOR DYNAMOELECTRIC MACHINE

Frank H. Fleischer, Fort Wayne, Ind., assignor to General Electric Company, a corporation of New York Application May 2, 1952, Serial No. 285,651

3 Claims. (Cl. 310—211)

This invention relates to rotor members for dynamoelectric machines and more particularly to the type of rotor member wherein a quill is used to attach the rotor to a shaft.

In the design of certain dynamoelectric machine rotors, particularly the squirrel cage rotors for induction motors used in hermetic refrigerator units, a sleeve or quill is customarily provided which serves the dual purpose of connecting the rotor to the compressor shaft and providing a thrust bearing surface rotatably supporting the rotor and compressor. In this design, it is very desirable that the sleeve or quill be firmly secured to the rotor in such a way that there is no possibility of the sleeve being loosened when the rotor is pressed on or taken off of the compressor shaft. This is an important feature since a certain number of compressors must necessarily be taken apart at one time or another and it is most important that it be possible to again mount the same rotor on the compressor shaft. In the past, a quill machined from solid stock has been pressed into the rotor bore or, in the alternative, a sleeve or quill of aluminum has been cast in place at the time of casting the squirrel cage rotor winding. In either case, it has been found that the sleeve or quill becomes loosened when the rotor is pressed on to the compressor shaft the first time, and it has been found that very few such rotors may again be pressed onto the compressor shaft after once being removed. In addition, either the machined or cast quill is a relatively inexpensive means for attaching the rotor to the compressor shaft and for forming a thrust bearing surface which will not become loosened from the rotor, thus permitting repeated removal and remounting on the compressor shaft.

It is therefore an object of this invention to provide an improved rotor construction incorporating the features enumerated above.

Further objects and advantages of this invention will become apparent by reference to the following description and the accompanying drawing, and the features of novelty which characterize this invention will be pointed out in the claims annexed to and forming a part of this specification.

This invention in its broadest aspects provides a rotor member having a core and a sleeve member for securing the rotor to a shaft, the sleeve member having an annular flange formed at one end thereof. This flange is secured to the core with the sleeve member extending either outwardly therefrom or inwardly into the bore of the core. The flange may be secured to one end of the core by being partially embraced by the cast end ring, or in the alternative, the sleeve may be positioned in a counterbored portion of the rotor and welded in place. In a further modification, the sleeve may be interspaced between two laminations. In all embodiments, the bore of the sleeve is preferably smaller than the central bore of the rotor, and thus the portion of the flange extending into the rotor bore provides a thrust bearing surface.

Figure 2:
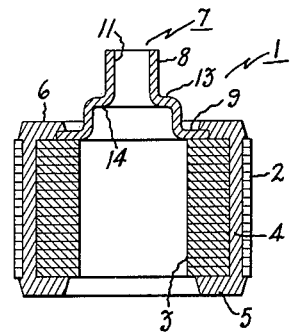
Figure 3:
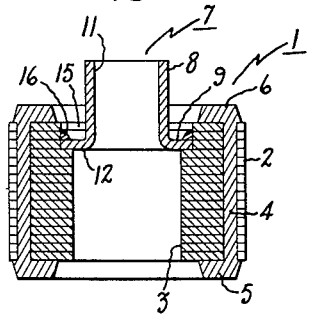
Figure 4:
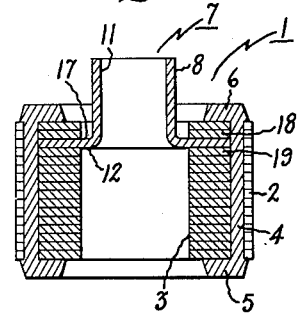

In the drawing, Fig. 1 illustrates one embodiment of my improved rotor construction; Fig. 2 illustrates a first modification thereof; Fig. 3 illustrates another modification; Fig. 4 shows yet another modified form of this improved rotor construction; and Fig. 5 a still further modification of this invention, all views being in cross-section.

Referring now to Fig. 1, there is shown a rotor member generally identified as 1, having a cylindrical core portion 2 formed of a plurality of relatively thin laminations of magnetic material. The core 2 is provided with a plurality of axially extending slots formed in its outer periphery and a central bore 3. A mass of cast conductive material, such as aluminum, fills the slots in the core 2 forming conductor bars 4 and integral end rings 5 and 6 are formed on the ends of the rotor 1 joining the conductors 4 to form a squirrel cage winding.

In order to secure the rotor 1 to the compressor shaft, a sleeve 7 is provided, having a cylindrical portion 8 and an annular flange portion 9. In the embodiment of Fig. 1, the annular flange portion 9 of the sleeve 7 abuts the axial end 10 of the core member 2 and is secured in place by being partially embraced by the cast end ring 6. It will be seen that the bore 11 of the cylindrical portion 8 is smaller than the bore 3 of the core 2 and thus the portion 12 of the flange 9 which extends into the bore 3 forms a thrust bearing surface. This general type of construction is widely used in hermetic refrigerator compressor design, the rotor and compressor being vertically mounted with the nose of a stationary bearing extending into the rotor bore 3 forming a thrust bearing. Here, the nose of the bearing extends sufficiently far within the rotor 1 to provide adequate bearing length, the thrust surface being provided by the portion 12 of the flange 9 and the concentricity by the cylindrical portion 8 of the sleeve 7. As pointed out above, the compressor shaft is secured in the bore 11 of the sleeve 7 and it will be readily seen that the complete assembly permits a compact compressor design. The sleeve 7 may be drawn or otherwise formed in a manner similar to an ordinary eyelet, and it will be readily apparent that this part is relatively low in cost compared with the machined or cast quill formerly used. In the event that a cast squirrel cage construction is not used, it will be readily apparent that the flange portion 9 could be connected to the core 2 by the squirrel cage conductors and may even be used to form the squirrel cage at one end of the rotor. The flange might also be secured to the end of the rotor 2 by other means such as by welding or by drive pins.

Referring now to Fig. 2 in which like elements are indicated by like reference numerals, it will be seen that the sleeve 7 is provided with a cylindrical portion 8, an enlarged portion 13 with the annular flange portion 9 being formed at one end of the large portion 13. Here again, the flange portion 9 is secured to one end of the core 2 by being partially embraced by the cast end ring 6. The bore 11 of the sleeve 7 is again smaller than the internal bore 3 of the core 2 and it will thus be readily apparent that the base 14 of the enlarged portion 13 of the sleeve 7 will form the thrust bearing surface. This construction may be used when the required location of the face or thrust bearing surface is above the surface of the top lamination.

Referring now to Fig. 3 in which like elements are again indicated by like reference numerals, it will be seen that the core member 2 is counterbored as at 15 with the flange portion 9 of the sleeve member 7 being positioned therein and secured to the core 2 in any suitable manner, as by welding as shown at 16. Here again, it is seen that the bore 11 of the sleeve member 7 is smaller than the central bore 3 of the core 2, and that the portion 12 of the flange member 9 will again form a thrust bearing surface. It will be apparent that this construction is used when it is desired that the thrust bearing surface be lower than the surface of the top lamination.

Referring now to Fig. 4, with the same elements again being indicated by like reference numerals, the sleeve 7 has an annular flange 17 interspaced between two laminations 18 and 19 of the core 2. Here the sleeve may be a complete lamination with holes punched for the squirrel cage bars 4 and with the cylindrical portion 8 extended to form the seat for pressing on the compressor shaft. In the alternative, the annular flange 17 may only be of such diameter as to extend to the bottom of the bars 4, as shown in Fig. 4. This construction avoids punching the slots for the bars in the heavy material forming the sleeve. When the rotor is cast, the entire assembly is firmly held together. It is again obvious that the core 11 of the cylindrical portion 8 is smaller than the central bore 3 of the core 2 and, therefore, that the portion 12 of the annular flange 17 within the bore 3 forms a thrust bearing surface. With this construction, the thrust bearing surface may be placed in any location desired by changing the location of the flange 17 toward one end or the other of the core.

Figure 5:
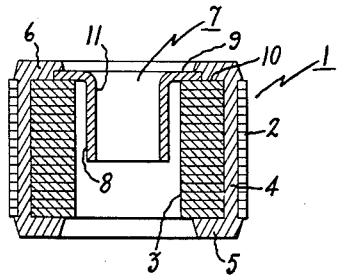

It will be readily understood that in each of the constructions of Figs. 1 to 4, inclusive, the sleeve 7 may be attached to the core so as to extend inwardly, as shown in Fig. 5 which illustrates the construction of Fig. 1 modified so that the sleeve 7 extends into the bore 3 of core 2. It will also be understood that the surface 12 in Figs. 1, 3 and 4, and the surface 14 of Fig. 2, need not be used as a thrust bearing surface since in many compressor arrangements, the rotor is positioned to leave a running clearance from the compressor.

It will now be readily apparent that this invention provides an improved rotor construction characterized by its simplicity, economical fabrication, and the fact that the rotor may be assembled on and removed from the shaft numerous times without loosening the attachment of the sleeve with the rotor.

While I have shown and described particular embodiments of this invention, further modifications and improvements will occur to those skilled in the art. I desire that it be understood, therefore, that this invention is not limited to the forms shown, and I intend in the appended claims to cover all modifications which do not depart from the spirit and scope of this invention.

What I claim as new and desire to secure by Letters Patent of the United States is:

1. A rotor member for a dynamoelectric machine comprising a core having slots formed in the outer periphery thereof and having a central bore, a sleeve member having a body portion for securing said rotor to a shaft with an annular flange formed at one end thereof, said sleeve being open at said end and a mass of cast conductive material filling said slots forming rotor conductors and securing said flange to said core, the outside diameter of said sleeve member body portion being smaller than the inside diameter of said bore.

2. A rotor member for a dynamoelectric machine comprising a core having slots formed in the outer periphery thereof and having a central bore, a sleeve member having a body portion for securing said rotor to a shaft with an annular flange formed at one end thereof, said sleeve being open at said end and a mass of cast conductive material filling said slots forming rotor conductors and forming end rings at the ends of said core joining said conductors to form a squirrel cage winding for said rotor, said flange abutting one end of said core, said cast end ring on said one end of said core at least partially embracing said flange for securing said sleeve to said core, the outside diameter of said sleeve member body portion being smaller than the inside diameter of said bore.

3. A rotor member for a dynamoelectric machine comprising a core having slots formed in the outer periphery thereof and having a central bore, a sleeve member having a body portion for securing said rotor to a shaft, said sleeve member body portion having an enlarged portion with an annular flange formed at the end thereof, said sleeve being open at said end, and a mass of cast conductive material filling said slots forming rotor conductors and securing said flange to said core, the outside diameter of said sleeve member body portion being smaller than the inside diameter of said bore of said core whereby the base of said enlarged portion of said sleeve forms a thrust bearing surface.

References Cited in the file of this patent

UNITED STATES PATENTS

| 1,190,054 | Wiard | July 4, 1916 |
|---|---|---|
| 1,601,122 | Janette | Sept. 28, 1926 |
| 1,663,607 | Naul | Mar. 27, 1928 |
| 1,934,981 | Johnson | Nov. 14, 1933 |
| 2,141,319 | Sato | Dec. 27, 1938 |
| 2,416,300 | Godsey | Feb. 25, 1947 |
| 2,474,210 | Abbott | June 28, 1949 |

FOREIGN PATENTS

| 47,857 | Switzerland | June 10, 1909 |